No. 648,254. Patented Apr. 24, 1900.
C. J. GROVES.
RESILIENT WHEEL.
(Application filed Feb. 1, 1900.)

(No Model.)

WITNESSES.
C. H. Gannett.
J. Murphy.

INVENTOR.
Charles J. Groves
by Jas. H. Churchill
Atty.

UNITED STATES PATENT OFFICE.

CHARLES J. GROVES, OF BOSTON, MASSACHUSETTS, ASSIGNOR OF TWO-THIRDS TO CHARLES F. HARLOW AND WILLIAM P. STRATTON, OF SAME PLACE.

RESILIENT WHEEL.

SPECIFICATION forming part of Letters Patent No. 648,254, dated April 24, 1900.

Application filed February 1, 1900. Serial No. 3,588. (No model.)

*To all whom it may concern:*

Be it known that I, CHARLES J. GROVES, a citizen of the United States, residing in Boston, in the county of Suffolk and State of Massachusetts, have invented an Improvement in Resilient Wheels, of which the following description, in connection with the accompanying drawings, is a specification, like letters on the drawings representing like parts.

This invention relates to a resilient wheel especially designed and adapted for use on bicycles, automobiles, and other vehicles.

In accordance with this invention the rim of the wheel is yieldingly connected to the hub, so that the said rim may be provided with a hard or rigid tire, and yet have the vehicle yieldingly supported. For this purpose I employ rigid sectional spokes, one section of which is pivotally connected at one end to the rim of the wheel, and the other section is pivotally engaged with the hub of the wheel, the said sections being separated by an interposed yielding medium, so that the spokes may move bodily toward and from the hub in a straight line, and so that they may also move laterally with relation to their normal position. These and other features of this invention will be pointed out in the claims at the end of this specification.

Figure 1:
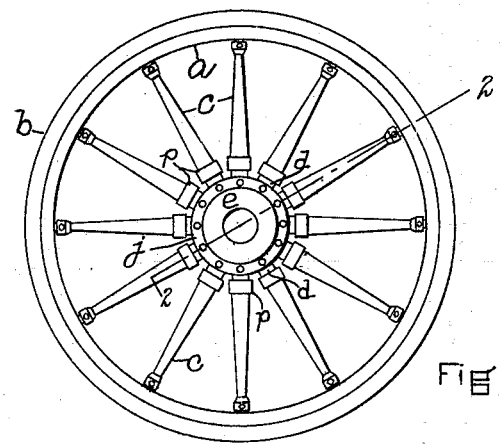
Figure 2:
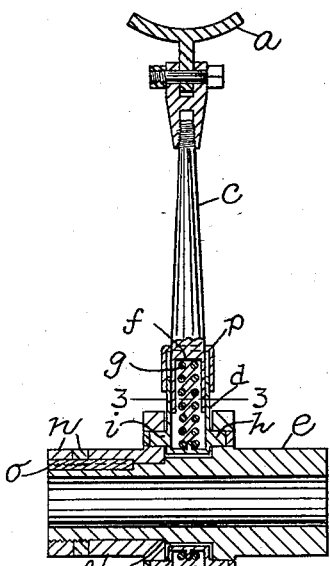
Figure 3:
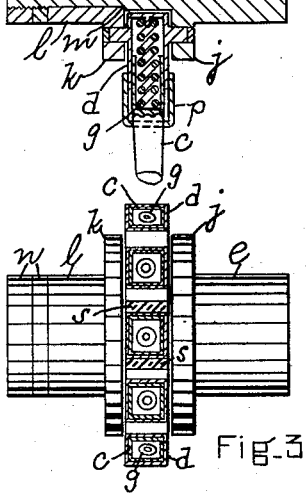

Figure 1 is a side elevation of a wheel embodying this invention; Fig. 2, a section on the line 2 2, Fig. 1; and Fig. 3, a section on the line 3 3, Fig. 2.

Referring to the drawings, $a$ represents the rim or felly, which may be provided with a solid or other tire $b$. The felly or rim $a$ has pivotally attached to it one end of spoke-sections $c$, which are rigid and may be of wood or metal and which coöperate with sections $d$, pivotally connected with the hub $e$. The inner end of each spoke-section $c$, as herein shown, is provided with a recess or socket $f$ and extends but partially into the hollow or socketed section $d$, in which is located a spiral spring or other yielding medium $g$, which bears against the bottom of the socket in the section $c$ and against the bottom of the socket in the section $d$. The socketed section $d$ is provided with trunnions $h\ i$, extended into suitable holes in annular flanges $j\ k$, the flange $j$ being shown as integral with the hub $e$ and the flange $k$ forming part of a sleeve $l$, fitted over one end of the hub $e$ and adapted to be forced or seated against a shoulder $m$ on the said hub by nuts $n$. The sleeve $l$ may and preferably will be held from turning on the hub by a key $o$.

From the above description it will be seen that the rim $a$ and hub $e$ may have movement relatively to one another, which is permitted by the yielding medium or springs $g$ and by the pivotal connection of the spoke-sections with the rim and the hub. In this manner a wheel having a hard or rigid tire may be made resilient, so that when the tire strikes an obstruction it will yield, and thus obtain the advantages of a pneumatic tire without any of its disadvantages.

By reference to Fig. 2 it will be seen that the rim and its attached spoke-section may be moved toward the hub against the yielding or cushioning action of the spring $g$, and in practice the spoke or spokes substantially in line with the obstruction engaged by the tire or rim will move toward the hub of the wheel in a straight or substantially-straight line, and that the spokes on opposite sides of a line through the hub and the obstruction will move laterally with relation to their normal position (shown in Fig. 1) by reason of the sectional spokes being pivoted at their opposite ends to the rim and hub.

The spoke-sections $c$ may and preferably will have attached to them hoods $p$, which are designed to fit over the outer ends of the sections $d$ and act as dust-guards to prevent dust, mud, &c., getting into the hollow section $d$, and also to act as a cover to conceal from view the portion of the spoke-section $c$, extended into the hollow section $d$, which if painted or varnished would soon become unsightly, whereas the hood in practice will be made of sufficiently-large diameter to prevent rubbing against the outside of the spoke-section. The space between adjacent spoke-sections $d$ may be filled with pieces $s$ of rubber. (See Fig. 3.)

I claim—

1. In a wheel, the combination with a rim, and a hub provided with separated flanges, of connecting-spokes composed of a rigid section pivoted at one end to the rim and having its other end provided with a socket, and a socketed section pivoted to said flanges and coöperating with the socketed end of the rigid section, and a spring interposed between said sections and extended into the sockets of both sections, substantially as described.

2. In a wheel, the combination with a rim, and a hub provided with separated annular flanges having holes, a socketed spoke-section having trunnions inserted into the holes in said annular flanges, a rigid spoke-section pivoted to the rim at one end and having a socket in its free end, and a spring having its opposite ends inserted into the sockets in said spoke-sections, substantially as described.

3. In a wheel, the combination with a rim, and a hub having separated annular flanges, socketed spoke-sections inserted between said annular flanges and pivoted thereto, spoke-sections pivoted to the rim and having their free ends socketed, the socket end of one spoke-section extending into the socketed end of the coöperating spoke-section, and spiral springs inserted in said sockets, and bearing against the ends of the same, substantially as described.

4. In a wheel, the combination with a rim, and a hub having separated annular flanges, socketed spoke-sections inserted between said annular flanges and pivoted thereto, spoke-sections pivoted to the rim and having their free ends socketed, the socket end of one spoke-section extending into the socketed end of the coöperating spoke-section, spiral springs inserted in said sockets, and bearing against the ends of the same, and a yielding medium interposed between adjacent socketed sections attached to the hub, substantially as described.

In testimony whereof I have signed my name to this specification in the presence of two subscribing witnesses.

CHARLES J. GROVES.

Witnesses:
JAS. H. CHURCHILL,
J. MURPHY.